Nov. 14, 1933.　　　　E. L. KELLER　　　　1,935,093
INDICATING MECHANISM FOR ELECTRIC MEASURING DEVICES
Filed Dec. 21, 1931
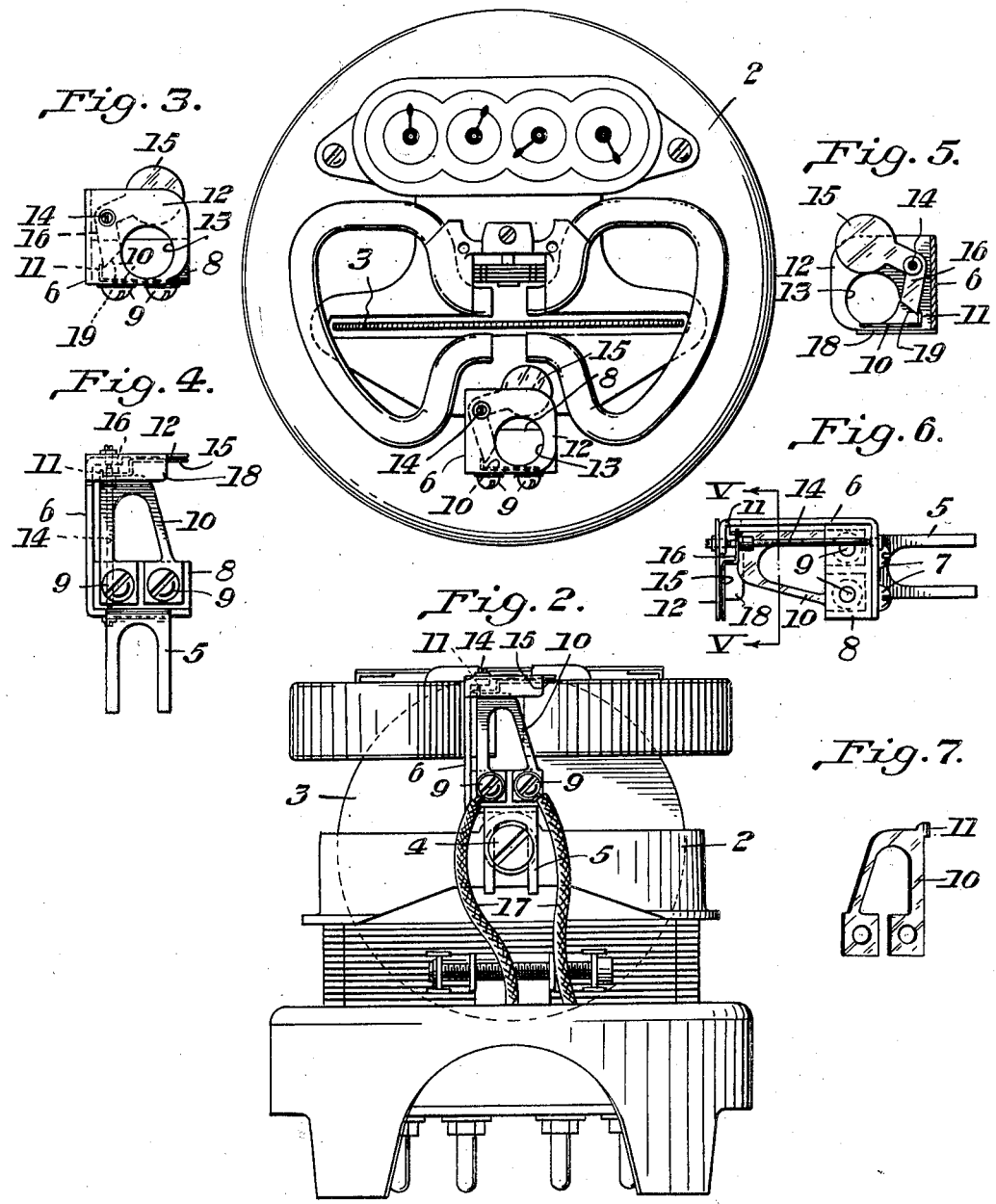
INVENTOR
Edward L. Keller Patented Nov. 14, 1933

1,935,093

UNITED STATES PATENT OFFICE 1,935,093

INDICATING MECHANISM FOR ELECTRIC MEASURING DEVICES

Edward L. Keller, Pittsburgh, Pa.

Application December 21, 1931
Serial No. 582,232

5 Claims. (Cl. 177—311)

This invention relates to indicating mechanism for electric measuring devices, and more particularly to indicating mechanism having indicating means movable respectively to operative and inoperative positions and adapted to assume the former position upon a predetermined energy flow through the measuring device. The invention further relates to an attachment adapted for connection to an electric measuring device of standard construction, such, for example, as a watthour meter, and adapted to make a visual indication upon a predetermined energy flow through the device.

While the invention has wide application, it may be illustrated for purposes of explanation as embodied in indicating mechanism for a domestic watthour meter.

Domestic watthour meters are constructed to operate at rates of energy flow within predetermined limits, and if the rate of energy flow substantially exceeds the predetermined limit for any given meter for a substantial period of time there is danger of damage to the meter or inaccurate measurement thereby. Furthermore, the charges made for domestic energy consumption are based upon certain expected rates of energy flow, and if the rate of energy flow through a given meter deviates substantially from the expected rate, the basis of charge should be altered.

By way of example the invention will hereafter be described as embodied in an attachment for a domestic watthour meter of standard construction which will make a visual indication upon a predetermined energy flow through the meter so that the meter reader may see such indication and report the same, whereupon appropriate action looking toward the installation of a meter of different capacity or a rate adjustment may be taken.

Other objects and advantages of the invention will become apparent as the following description of a present preferred embodiment thereof proceeds.

In the accompanying drawing I have shown a present preferred embodiment of the invention, in which Figure 1 is a front elevational view, mostly diagrammatic, of a portion of a watthour meter having an indicating attachment connected therewith;

Figure 2 is a bottom plan view of the mechanism shown in Figure 1;

Figure 3 is a front elevational view of the indicating attachment;

Figure 4 is a bottom plan view of the indicating attachment;

Figure 5 is a cross-sectional view taken on the line V—V of Figure 6;

Figure 6 is a top plan view of the indicating attachment; and

Figure 7 is a detail perspective view of a portion of the attachment.

Referring now more particularly to the drawing, reference numeral 2 designates generally a domestic watthour meter of standard construction which forms no part of the present invention and which, therefore, need not be described in detail. Such meter is provided with the usual rotatable disc 3 which is journaled between upper and lower jewel screws, the former of which is not shown and the latter of which is shown at 4 in Figure 2. Although the attachment presently to be described may be connected to the meter in various ways, the lower jewel screw 4 is utilized as a convenient means of connection, as will presently be described.

There is provided an attachment, shown in Figures 3 to 6, inclusive, which has an attaching yoke 5 serving as a base or supporting portion, which yoke is adapted to straddle the lower disc bearing and to be held in place by the lower jewel screw 4, as shown in Figure 2. The yoke 5 may be formed as an integral part of a frame 6 to which is connected by screws 7 a block 8 of insulating material. Connected with the block 8 by screws 9 is a bimetallic strip 10 (Figure 7), the material of which may be of usual construction and is adapted to flex upon being heated, as well known. The strip 10 carries an upward projection 11 for a purpose to be presently described.

Connected with the front of the frame 6 is a face plate 12 having a hole 13 therethrough. Journaled in the frame is a shaft 14 carrying at its forward extremity but behind the face plate a flag indicator 15 adapted to assume a position in which it is visible through the hole 13 and a position in which it is not substantially visible through such hole. The flag indicator 15 has an arm 16 adapted to cooperate with the projection 11 on the bimetallic strip 10, as will presently be described. The bimetallic strip 10 is preferably connected in series with the current coil of the meter by leads 17 which are held beneath the screws 9.

Normally the parts are in the position shown in Figures 1, 3 and 5. The flag indicator 15 is maintained in its upper position, that is to say, in the position in which it is not substantially visible through the hole 13, by reason of the engagement of the projection 11 with the arm 16, as shown. The indicator is overbalanced so that gravity tends to move it downwardly to a position in which it lies directly behind the hole 13 and is visible therethrough.

The current passing through the meter flows through the bimetallic strip 10. Such strip is inherently of such nature that as the rate of energy flow increases, the strip becomes heated. As the strip becomes heated, due to its bimetallic character it tends to flex in such manner that its free end, carrying the projection 11, moves downwardly. The parts are so proportioned and adjusted that when energy is flowing at rates within the predetermined limits, that is to say, at the rates normally expected in domestic consumption, although the bimetallic strip 10 will be heated to some extent, it will not flex sufficiently to move the projection 11 out of contact with the arm 16. When, however, the rate of energy flow exceeds the predetermined limit and continues in excess of such limit for a predetermined time, the strip 10 will be raised in temperature and consequently will flex to such an extent that the projection 11 will move downwardly out of contact with the arm 16, permitting the flag indicator 15 to drop due to the force of gravity until its lower portion rests on the inturned flange 18 forming a part of the face plate 12. At such time the flag indicator is directly opposite the hole 13.

The sensitivity of the attachment may, of course, be determined by the adjustment of the parts and by the size and character of the bimetallic strip 10. For example, it may be so constructed and adjusted that when used on a 5 ampere meter, double the rated current, or 10 amperes, flowing through the meter for twelve minutes will heat the bimetallic strip sufficiently that the projection 11 will move downwardly out of contact with the arm 16, permitting the indicator to fall. If the rate of current flow should increase above 10 amperes, less time would be required to heat the bimetallic strip sufficiently to trip the indicator. Tripping of the indicator has no effect upon the continued flow of energy in the circuit or the continued operation of the meter, but leaves a visual indication which may be seen by the meter reader and reported to the proper official. A record may be kept as to the frequency with which the indicator is tripped and an investigation may be made to determine whether a meter of different capacity should be installed or a change in the basis of charge made.

Thus the indicating mechanism is effective upon a predetermined energy flow through the meter and the visual indication is permanent in nature, that is to say it remains until the flag indicator is re-set in its upper or inoperative position by the meter reader. Re-setting is easily accomplished by removing the meter case and moving the flag indicator in the clockwise direction about the axis of the shaft 14, viewing Figure 5, until the parts assume the position shown in that figure, the beveled extremity 19 serving to cam down the strip 10 to aid in the re-setting.

The indicating mechanism is within the meter case and cannot be tampered with by unauthorized persons. It may be attached to any standard meter simply by inserting the yoke 5 behind the lower jewel screw and tightening such screw and by attaching the leads 17 to the opposite sides of the bimetallic strip so that such strip is in series with the current coil. This may be done simply by disconnecting the lead from the current coil to one of the binding posts on the inside of the meter and connecting one of the leads 17 to the first mentioned lead and by connecting the other lead 17 to the binding post mentioned.

Instead of connecting the bimetallic strip 10 in series with the current coil of the meter, other provision may be made for heating such strip upon increase in the energy flow through the meter. For example, a coil of wire might be connected in series with the meter and arranged in thermo-conductive relationship with the bimetallic strip so that the temperature of the bimetallic strip would be indirectly governed by the energy flow through the meter.

While I have shown and described a present preferred embodiment of the invention, it is to be distinctly understood that the same is not limited thereto, but may be otherwise variously embodied within the scope of the following claims.

I claim:

1. The combination with an electric meter including an electro-magnetic winding, of a signal mounted adjacent said meter and having indicating and non-indicating positions, and adapted, when moved from the non-indicating position to the indicating position, to remain in said indicating position until manually reset, and thermally responsive means carried by said meter and subject to the heating effect of the current traversing said winding, said means being effective under predetermined conditions to cause movement of said signal from non-indicating position to indicating position.

2. The combination with a mechanism for measuring electric energy, of a signal mounted adjacent said mechanism having indicating and non-indicating positions and adapted, when moved from the non-indicating position to the indicating position, to remain in indicating position until manually reset, and thermally responsive means subject to the heating effect of the load current measured by said mechanism, said means being effective under predetermined conditions to cause movement of the signal from non-indicating position to indicating position.

3. The combination with a watt hour meter having a series coil, of a signal mounted adjacent the meter having indicating and non-indicating positions and adapted, when moved from the non-indicating position to the indicating position, to remain in said indicating position until manually reset, and thermally responsive means carried on the meter and subject to the heating effect of the current traversing said coil, said means being effective under predetermined conditions to cause movement of said signal from non-indicating position to indicating position.

4. As an article of manufacture, a demand indicator adapted to be used in conjunction with watt hour meters, comprising a signal having indicating and non-indicating positions and adapted, when moved from the non-indicating position to the indicating position, to remain in said indicating position until manually reset, means whereby the signal may be mounted adjacent the meter, and a thermally responsive member subject to the heating effect of the load current being measured by the meter, said member being effective under predetermined conditions to cause movement of said signal from non-indicating position to indicating position.

5. As an article of manufacture, a demand indicator for watt hour meters having shaft bearings, comprising a frame, a flag carried on the frame movable by gravity, when released, from non-indicating position to indicating position, and adapted to remain in the latter position until manually reset, a yoke on the frame adapted to engage one of the meter bearings for supporting the indicator, and a thermally responsive member attached to the frame for holding the flag in non-indicating position but adapted, on deflection, to release the flag.

EDWARD L. KELLER.